United States Patent

Nogami et al.

[11] Patent Number: 5,529,857
[45] Date of Patent: Jun. 25, 1996

[54] HYDROGEN-ABSORBING ALLOY ELECTRODE AND PROCESS FOR PRODUCING THE SAME

[75] Inventors: Mitsuzo Nogami; Mamoru Kimoto; Yoshinori Matsuura; Koji Nishio, all of Osaka; Toshihiko Saito, Kyoto, all of Japan

[73] Assignee: Sanyo Electric Co., Ltd., Osaka, Japan

[21] Appl. No.: 318,108

[22] Filed: Oct. 5, 1994

[30] Foreign Application Priority Data

Oct. 6, 1993 [JP] Japan .................. 5-276166
Dec. 29, 1993 [JP] Japan .................. 5-352524

[51] Int. Cl.$^6$ .................................... H01M 4/38
[52] U.S. Cl. ................. 429/59; 420/900; 427/123
[58] Field of Search ............... 420/900; 427/123, 427/191, 201, 383.1, 383.7; 429/59

[56] References Cited

U.S. PATENT DOCUMENTS 5,219,678  6/1993  Hasebe et al. ........................ 429/59
5,395,403  3/1995  Kimoto et al. ................... 427/201 X

FOREIGN PATENT DOCUMENTS 0347507  12/1989  European Pat. Off. .
0420669   4/1991  European Pat. Off. .
0450112  10/1991  European Pat. Off. .
0530659   3/1993  European Pat. Off. .
0557522   9/1993  European Pat. Off. .
3116655   5/1991  Japan .

*Primary Examiner*—Stephen Kalafut
*Attorney, Agent, or Firm*—Birch, Stewart, Kolasch & Birch

[57] ABSTRACT

A first hydrogen-absorbing alloy electrode is obtained by applying a hydrogen-absorbing alloy powder on a collector or having a collector filled with a hydrogen-absorbing alloy powder and then sintering the hydrogen-absorbing alloy powder. The hydrogen-absorbing alloy powder is pre-pared by centrifugal spraying or gas atomizing and particles constituting the powder have a spherical shape, a nearly spherical shape, an egg-like shape or a mixed shape including the foregoing. The hydrogen-absorbing alloy electrode can readily be produced at low cost and have high packing density and good corrosion resistance, and can hence yield, when used for negative electrodes, metal hydride secondary batteries having excellent cycle characteristics. A second hydrogen-absorbing alloy electrode comprises a mixed powder containing a spherical-particle powder of a hydrogen-absorbing alloy and a powder as pulverized of the same alloy in a specific ratio. This electrode has high packing density and electronic conductivity, and can therefore gives batteries having excellent discharge characteristics on both high-rate discharge and low-rate discharge.

9 Claims, 8 Drawing Sheets

HYDROGEN-ABSORBING ALLOY ELECTRODE AND PROCESS FOR PRODUCING THE SAME

BACKGROUND OF THE INVENTION

This application claims the priority of Japanese Patent Application Nos. 5-276166 filed on Oct. 6, 1993 and 5-352524 filed on Dec. 29, 1993, which are incorporated herein by reference.

1. Field of the Invention

The present invention relates to a hydrogen-absorbing alloy electrode used as a negative electrode for metal hydride alkali secondary batteries and to a process for producing the same.

2. Description of the Prior Art

Hydrogen-absorbing alloys capable of absorbing and discharging hydrogen have been developed actively in recent years. Metal hydride alkaline secondary batteries utilizing these hydrogen-absorbing alloys as negative electrode materials have been attracting much attention and expected to become a mainstream in the next generation, since they are lighter and can be provided with higher capacity as compared to lead, nickel-cadmium and like conventional secondary batteries.

Metal hydride alkaline secondary batteries are generally produced by a process which comprises the steps of pulverizing a block-like hydrogen-absorbing alloy into a powder, mixing the hydrogen-absorbing alloy powder with a binder and other ingredients to obtain a paste, applying the paste on a collector or having a collector be filled with the paste and solidifying the paste by heat drying.

However, the above process have the following problems due to, firstly, the presence of a binder in the obtained electrode and, secondly, the hydrogen-absorbing alloy powder being produced by casting and pulverization.

(A) Problems due to the presence of a binder

① The presence of a binder on the surface of hydrogen-absorbing alloy particles obstructs formation of 3-phase interfaces between the gas (oxygen), liquid (electrolyte) and solid (hydrogen-absorbing alloy particles), thereby preventing the water formation reaction on consumption of oxygen from proceeding smoothly. As a result, the inside pressure of the battery increases and the electrolyte is eventually discharged together with oxygen outwardly from the battery, so that the battery has poor cycle characteristics. Besides, it becomes necessary to charge with a small current and hence the battery has poor rapid chargeability.

② The presence of a binder between particles of a hydrogen-absorbing alloy decreases the electronic conductivity between the particles, thereby decreasing the degree of activation of the electrode.

③ It is necessary to decrease the amount of a hydrogen-absorbing alloy to fill up the electrode by the volume occupied by the binder, resulting in a low packing density.

(B) Problems due to casting and pulverization process

① Casting and pulverization requires a long time to cool a hydrogen-absorbing alloy melt, whereby the same elements contained therein tend to flock together and segregation tends to occur. The metal structure thus formed nonuniformly is inferior in corrosion resistance. Then, the surface of the alloy is oxidized (corroded) to form an inert layer, which deteriorates the cycle characteristics.

② The manufacturing process of negative electrodes becomes complex, since a separate pulverization process is necessary.

In order to solve the problems (A) due to the presence of a binder, a sintering process has become available, which comprises bonding by sintering, without using any binder, hydrogen-absorbing metal particles obtained by the casting and pulverization process.

This process can solve the problems (A) due to the presence of binder, but the problems (B) due to casting and pulverization process remains unsolved. Furthermore, it is difficult to sinter the hydrogen-absorbing alloy particles obtained by casting and pulverization process, since the particles tend to contact with each other while forming "area contact" and hence heat diffuses upon sintering.

Known hydrogen-absorbing alloys for electrodes include those having a pulverized powder form obtained by pulverizing a flake-like or spherical powder mechanically or electrochemically (Japanese Patent Application Laid-open No. 126361/1992) and those of a spherical powder form obtained by gas atomization (Japanese Patent Application Laid-open No. 116361/1991).

However, conventional hydrogen-absorbing alloy electrodes using the pulverized powder or spherical powder alone have suffered the following troubles.

Hydrogen-absorbing alloy electrodes utilizing the pulverized powder alone have the drawback of low packing density, although they have the advantage of having a small electric contact resistance thanks to the alloy particles being contacted with each other while forming, principally, area contact. On the other hand, hydrogen-absorbing alloy electrodes using the spherical powder alone have the drawback of having a large electric contact resistance because of point contact formed by the alloy particles, although they have the advantage of high packing density. If the former, having a low packing density, are used as a negative electrode, the low-rate discharge characteristics will become worse. If the latter, having a large electric contact resistance between alloy particles, are used as a negative electrode, the high-rate discharge characteristics will become worse.

SUMMARY OF THE INVENTION

Accordingly, an object of the present invention is to provide a hydrogen-absorbing alloy electrode having excellent characteristics, without the problems of the above (A) or (B).

Another object of the present invention is to provide a simple process for readily producing the above electrode.

Still another object of the present invention is to provide a hydrogen-absorbing alloy electrode capable of giving metal-hydrogen alkaline secondary batteries having excellent discharge characteristics upon both low-rate discharge and high-rate discharge.

The present invention provides a hydrogen-absorbing alloy electrode obtained by applying a hydrogen-absorbing alloy powder on a collector or having a collector filled with a hydrogen-absorbing alloy powder and then sintering the hydrogen-absorbing alloy powder, said hydrogen-absorbing alloy powder having been prepared by centrifugal spraying or gas atomizing and particles constituting said powder having a spherical shape, a nearly spherical shape, a hen's egg-like shape or a mixed shape including the foregoing (hereinafter these shapes are sometimes simply referred to as "spherical or nearly spherical shape).

The present invention also provides a process for producing hydrogen-absorbing alloy electrodes, which comprises the successive steps of:

an alloy powder preparation step which comprises preparing a hydrogen-absorbing alloy powder by centrifugal spraying or gas atomizing, particles of said hydrogen-absorbing alloy powder having a spherical or nearly spherical shape;

a paste preparation step which comprises preparing a paste by kneading a mixture comprising the hydrogen-absorbing alloy powder and a binder solution obtained by dissolving a binder in water or in an organic solvent; and a sintering step which comprises applying the obtained paste on a collector or having a collector filled with the obtained paste, burning the paste to decompose and remove the binder and sinter the hydrogen-absorbing alloy powder.

The present invention further provides a hydrogen-absorbing alloy electrode, utilizing as a material thereof a mixed powder containing a hydrogen-absorbing alloy powder with particles having a spherical shape and the same alloy in a form as mechanically pulverized in a ratio by weight of 20:80 to 95:5.

BRIEF DESCRIPTION OF THE DRAWINGS

A more complete appreciation and many of the attendant advantages thereof will be readily obtained as the same become better understood by reference to the following detailed description when considered in connection with the accompanying drawings wherein.

DETAILED DESCRIPTION OF THE PREFERRED EMBODIMENTS

Figure 1:
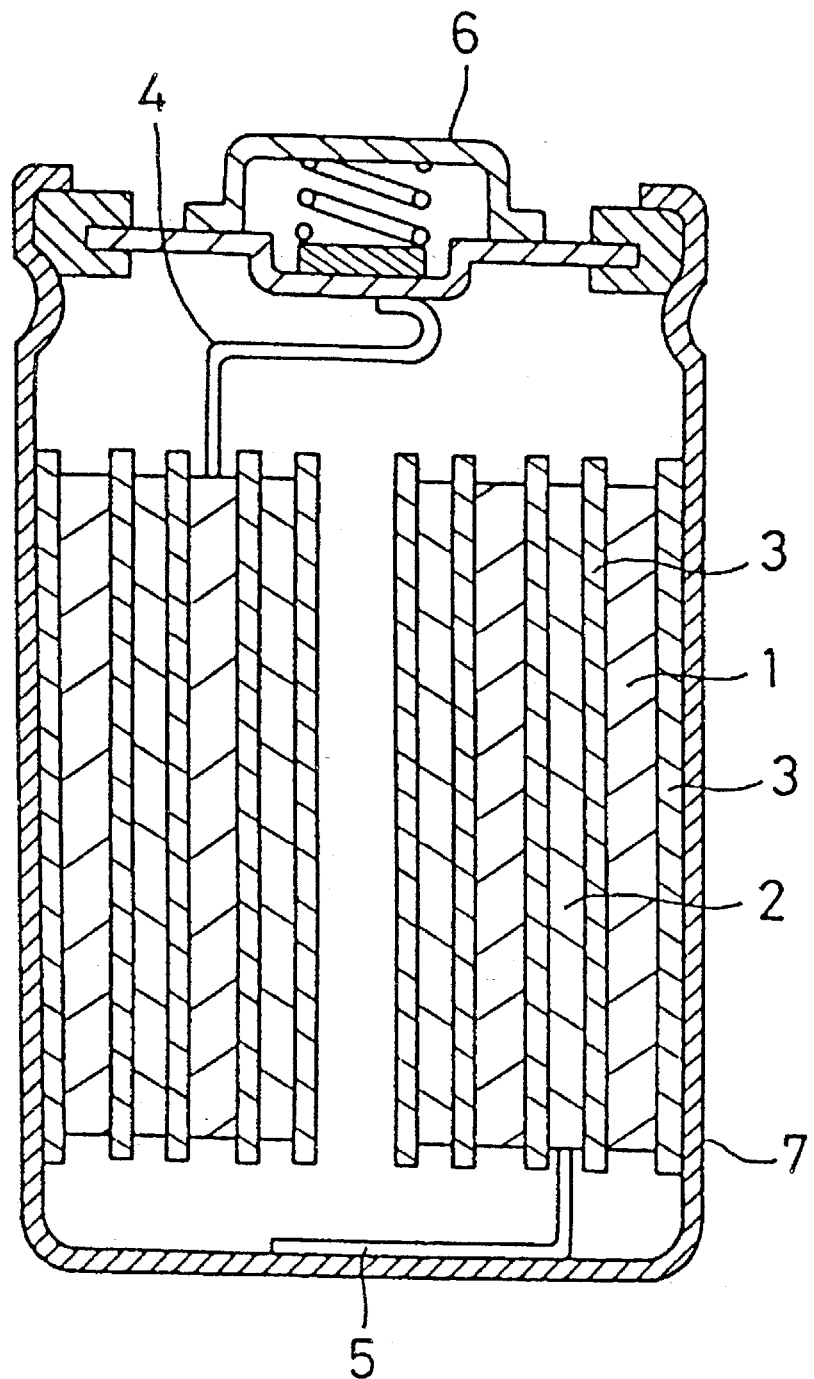
FIG. 1 is a cross-sectional view of a battery of AA-size according to the present invention.

The hydrogen-absorbing alloy electrode of the first invention is produced by the process of the present invention for producing hydrogen-absorbing alloy electrodes, and, therefore, the two inventions are described together, as "the first invention", below.

The hydrogen-absorbing alloy powder used for the electrode of the first invention consists of particles having a spherical or nearly spherical shape and can be obtained by the alloy powder preparation step in the process of the present invention. The alloy powder preparation step comprises using centrifugal spraying or gas atomizing. The centrifugal spraying comprises dropping a hydrogen-absorbing alloy melt onto a disc rotating at a high speed, while the gas atomizing comprises extruding a hydrogen-absorbing alloy melt through a fine nozzle under a pressure of an inert gas such as argon, to form a spray. Other pulverization processes are not applicable to the present invention, since for example the roll process known to comprise dropping a hydrogen-absorbing alloy melt onto the surface of a rotating roll cannot produce particles of a spherical or nearly spherical shape. Instead, the roll process gives flake-like particles, since the melt solidifies while being deprived of heat by the roll, and such flake-like particles cannot have good cycle characteristics when used in an electrode.

Examples of hydrogen-absorbing alloys preferably usable in the present invention are those containing Ni, such as MmNi$_5$ alloys and Ti-Zr-Ni alloys.

The hydrogen-absorbing alloy powder used in the invention preferably has an average particle diameter of 30 to 120 μm. With an average particle diameter of less than 30 μm, which obstructs direct contact between the hydrogen-absorbing alloy particles, the particles are difficult to sinter. On the other hand, the packing density of the powder decreases with the average particle diameter exceeding 120 μm.

The hydrogen-absorbing alloy powder of a spherical or nearly spherical shape thus obtained is then kneaded with a solution of a binder, such as polyethylene oxide (PEO), polyvinyl alcohol (PVA), polyvinylpyrrolidone, hydroxypropylcellulose or like polymers in water or an organic solvent, to give a paste. Before conducting this kneading, it is desirable to subject the alloy powder to a dry surface treatment process which comprises mixing with the alloy powder a surface treating material which is harder than the former and then stirring the mixture and, preferably after removal of the surface treating material, to subject the treated powder to the succeeding paste preparation step. Examples of the above surface treating agent are ultrafine ceramic balls, stainless steel balls and metal balls. The dry surface treatment increases the degree of activation of the hydrogen-absorbing alloy. Besides, the treatment, being a dry process without using an acid or alkaline solution, requires no waste water disposal after the treatment or requires no additional drying of the hydrogen-absorbing alloy powder. On the other hand, with a conventional wet surface treatment which comprises immersing a hydrogen-absorbing alloy powder in an acid or alkaline solution to remove impurities such as oxides from the surface of the alloy powder, it is necessary, after the treatment, to treat the resulting waste water and to dry up the treated alloy powder.

The above dry surface treatment can be employed only in the process which comprises surface treating a hydrogen-absorbing alloy powder having a spherical or nearly spherical shape and then sintering the treated powder, and cannot apply to processes which comprises sintering a hydrogen-absorbing alloy powder having irregular shapes as obtained by casting and pulverization. This is because surface treatment of irregular shaped hydrogen-absorbing alloy particles produces fine particles thereof having an extremely small diameter, which makes difficult the succeeding sintering operation.

It is also recommended, on the kneading of the hydrogen-absorbing alloy powder with a binder solution, to add 1 to 10 parts by weight based on 100 parts by weight of the alloy powder of a powder of at least one metal selected from the group consisting of nickel, cobalt and nickel-cobalt alloys, to prepare a paste. This additional metal powder can make the resulting hydrogen-absorbing alloy electrode more flexible. In particular, with cylindrical batteries which house this flexible type of hydrogen-absorbing alloy electrode, the active material drops off in a negligibly small amount during wrapping, so that formation of internal short-circuit is suppressed. An amount of the additional metal powder of less than 1% by weight cannot produce this effect sufficiently, while amounts exceeding 10% by weight decreases the relative content of the hydrogen-absorbing alloy powder and decreases the battery capacity.

The paste thus prepared is then applied on a collector of a metal substrate, such as perforated nickel plate or foamed nickel plate, or this type of metal substrate is filled with the paste.

The sintering step is generally conducted at a temperature of 800° to 1,000° C. for about 0.5 to 2 hours, to produce a sufficient effect. With conventional sintered electrodes, it has been necessary to sinter at a temperature exceeding 1,050° C. for about 6 hours. However, in the present invention, utilizing a hydrogen-absorbing alloy powder, with the particles having a spherical or nearly spherical shape, the particles can be sufficiently sintered at a relatively low temperature and in a short period of time.

To summarize, the hydrogen-absorbing alloy electrode of the first invention has a high packing density and corrosion resistance and hence can give, when used as negative electrode, metal hydride secondary batteries having excellent cycle characteristics; and the process of the present invention, directly preparing a hydrogen-absorbing alloy powder from a melt of the hydrogen-absorbing alloy and being capable of sintering the powder at a low temperature and in a short period of time, can realize ready electrode preparation at low manufacturing costs.

The second invention of the present invention is now described.

The hydrogen-absorbing alloy electrode of the second invention comprises a mixed powder containing a hydrogen-absorbing alloy in a spherical form and the same alloy in a form as pulverized (hereinafter referred to as "pulverized powder") in a ratio by weight of 20:80 to 95:5.

Those hydrogen-absorbing alloys preferred in the first invention are also usable for the second invention.

If the spherical powder is contained in the mixed powder in a ratio less than the above range, the mixed powder will become close to the pulverized powder alone, thereby decreasing the packing density and decreasing the discharge capacity at low-rate discharges. On the other hand, if the ratio of the spherical powder exceeds the above range, the mixed powder will become close to the spherical powder alone. In this case, the alloy particles contact with each other while forming "point contacts", so that the electronic conductivity decrease and the discharge capacity at high-rate discharges decreases.

Examples of the spherical powder used in the present invention are those prepared by rotating disc, rotating nozzle, single roll, twin roll, gas atomizing and like processes (see, for example, Japanese Patent Application Laid-open No. 116655/1991). The spherical powder in the present invention includes those having any shape close to sphere formed by a curved plane, in addition to true sphere.

Examples of the pulverized powder in the present invention are those obtained from ingots, flakes, spherical powders and the like of hydrogen-absorbing alloys, obtained through mechanical means such as ball mill.

Other features of the invention will become apparent in the course of the following descriptions of exemplary embodiments which are given for illustration of the invention and are not intended to be limiting thereof.

EXAMPLES

Tables 1 and 2 show, for easier understanding, with respect to the hydrogen-absorbing alloy powders used in Examples 1-①  through 1-⑤, Comparative Example 1, Examples 2-① through 2-④ and Comparative Example 2, the production processes for the powders, whether or not subjected to dry surface treatment, whether or not cobalt powder or the like being added, binding method (sintering or paste application) and coding of the alloys, and coding of the electrodes and batteries.

TABLE 1

| Ex. No. | Process for powder preparation (*1) | Dry surface treatment | Metal powder addition | Binding method | Rare-earth metal hydrogen-absorbing alloy coding | | |
|---|---|---|---|---|---|---|---|
| | | | | | Alloy | Electrode | Battery |
| 1-① | Atm. | No | No | Sinter | MA | $E_{MA}$ | $B_{MA}$ |
| 1-② | Cent. | No | No | Sinter | MB | $E_{MB}$ | $B_{MB}$ |
| 1-③ | Atm. | Yes | No | Sinter | MAS | $E_{MAS}$ | $B_{MAS}$ |
| 1-④ | Cent. | Yes | No | Sinter | MBS | $E_{MBS}$ | $B_{MBS}$ |
| 1-⑤ | Atm. | No | Yes | Sinter | MA | $E_{MAF}$ | $B_{MAF}$ |
| Comp. Ex. 1 | C & P | No | No | Paste | MC | $E_{MC}$ | $B_{MC}$ |

Notes *1
Atm.: gas atomization
Cent.: centrifugal spraying
C & P: casting and pulverization

TABLE 2

| Ex. No. | Process for powder preparation (*1) | Dry surface treatment | Metal powder addition | Binding method | Rare-earth metal hydrogen-absorbing alloy coding | | |
|---|---|---|---|---|---|---|---|
| | | | | | Alloy | Electrode | Battery |
| 2-① | Atm. | No | No | Sinter | TA | $E_{TA}$ | $B_{TA}$ |
| 2-② | Cent. | No | No | Sinter | TB | $E_{TB}$ | $B_{TB}$ |
| 2-③ | Atm. | Yes | No | Sinter | TAS | $E_{TAS}$ | $B_{TAS}$ |
| 2-④ | Cent. | Yes | No | Sinter | TBS | $E_{TBS}$ | $B_{TBS}$ |
| Comp. Ex. 1 | C & P | No | No | Paste | TC | $E_{TC}$ | $B_{TC}$ |

Example 1

[Example 1-①]

[Preparation of negative electrode]

A mixture of Mm (Misch metal), Ni, Co, Al and Mn in a mole ratio of 1.0:3.2:1.0:0.2:0.6 was prepared and the mixture was melted in a high frequency induction heating furnace at 1,500° C., to give a hydrogen-absorbing alloy melt. The hydrogen-absorbing alloy melt was subjected to a gas atomization process which comprises extruding the melt under a pressure of argon through fine holes (hereinafter all "gas atomizing processes were carried out in this manner"), to yield a hydrogen-absorbing alloy powder MA (composition formula: $MmNi_{3.2}Co_{1.0}Al_{0.2}Mn_{0.6}$) with particles having a spherical or nearly spherical shape and a diameter ranging from 10 to 100 μm (average particle diameter: 60 μm).

A paste was then prepared by dispersing 100 parts by weight of the obtained hydrogen-absorbing alloy powder in 20 parts by weight of a 5% aqueous solution of polyethylene oxide (PEO) as a binder. The paste was applied on both sides of a collector, and the collector was dried and then heat treated in an electric oven under an argon atmosphere at 900° C. for 1 hour to sinter the hydrogen-absorbing alloy particles, while the PEO was being decomposed off, to obtain a sintered body. The sintered body was cut to prescribed lengths, which were then rolled, to give negative electrode $E_{MA}$.

[Preparation of positive electrode]

A sintered substrate having a porosity of 90% was impregnated with an aqueous nickel nitrate solution containing cobalt nitrate and zinc nitrate, and then immersed in an aqueous sodium hydroxide solution, to precipitate the nickel hydroxide, cobalt hydroxide and zinc hydroxide that formed in the pores of the sintered body. This procedure was repeated 10 times, and then the substrate was washed and dried, to give a sintered nickel positive electrode comprising the substrate with the pores filled with active materials such as nickel hydroxide.

[Preparation of alkaline electrolyte]

An alkaline electrolyte comprising a 30% by weight aqueous solution of KOH was prepared.

Preparation of battery

An AA-size battery $B_{MA}$ according to the present invention was prepared using the above positive and negative electrodes and alkaline electrolyte. A polyamide nonwoven fabric was used as separator, which was impregnated with the alkaline electrolyte.

FIG. 1 is a schematic cross-sectional view of the $B_{MA}$ according to the present invention thus prepared. In the FIGURE, the battery $B_{MA}$ comprises a positive electrode 1, a negative electrode 2, a separator 3 separating the two electrodes, a positive electrode lead 4, an negative electrode lead 5, a positive electrode outside terminal 6, a negative electrode can 7 and other parts. The positive and negative electrodes 1 and 2 are housed in the negative electrode can 7, while being spirally wound via the separator 3 impregnated with the alkaline electrolyte. The positive electrode 1 is connected, via the positive electrode lead 4, to the positive electrode outside terminal 6, and the negative electrode 2 to the negative electrode can 7 via the negative electrode lead 5, so that the chemical energy generated inside the battery can be taken out as electric energy.

[Example 1-②]

Example 1-① was repeated except that there was used a centrifugal spraying process which comprises adding dropwise a hydrogen-absorbing alloy melt onto a disc rotating at a rate of 10,000 to 20,000 rpm (hereinafter all "centrifugal spraying processes" were carried out in this manner) to obtain a hydrogen-absorbing alloy powder having a spherical or nearly spherical powder MB, to prepare a negative electrode $E_{MB}$. Example 1-② was further repeated except that this negative electrode $E_{MB}$ was used, to prepare a battery according to the present invention, $B_{MB}$.

[Example 1-③]

Example 1-① was repeated except that a hydrogen-absorbing alloy powder MA was subjected to a dry surface treatment as follows. The alloy powder was mixed with 10% by weight based on the weight of the alloy powder of a ceramic ultrafine powder having a particle diameter of 10 μm and stirring the mixture in a ball mill at a rotation number of 120 rpm for 30 minutes, to remove impurities such as oxide membrane present on the surface of the alloy powder (hereinafter all "dry surface treatments" were carried out in this manner). The ceramic powder and the alloy swarf that had formed were removed, to obtain a hydrogen-absorbing alloy powder MAS, which was then used for preparing a negative electrode $E_{MAS}$ in the same manner. Example 1-① was further repeated except that this negative electrode $E_{MAS}$ was used, to prepare a battery according to the present invention, $B_{MAS}$.

The surface of the hydrogen-absorbing alloy particles had been shaved off in the ball mill in a markedly small amount. The average particle diameter of the hydrogen-absorbing alloy powder after the dry surface treatment was 60 μm, same as in Example 1-①.

[Example 1-④]

Example 1-① was repeated except that there was used a hydrogen-absorbing alloy powder MBS obtained by dry surface treating the hydrogen-absorbing alloy powder MB obtained by centrifugal spraying, to prepare a negative electrode $E_{MBS}$. Example 1-① was further repeated except that this negative electrode $E_{MBS}$ was used, to prepare a battery according to the present invention, $B_{MBS}$.

[Example 1-⑤]

Example 1-① was repeated except that Ni powder as a softening agent was added to the hydrogen-absorbing alloy powder MA in an amount of 5% by weight based on the alloy powder, to prepare a negative electrode $E_{MAF}$. Example 1-① was further repeated except that this negative electrode $E_{MAF}$ was used, to prepare a battery according to the present invention, $B_{MAF}$.

Comparative Example 1

A hydrogen-absorbing alloy powder MC was prepared by a casting and pulverization process which comprises injecting a hydrogen-absorbing alloy melt into a mold, cooling it to obtain a hydrogen-absorbing alloy ingot and then pulverizing the ingot in a ball mill under an inert gas atmosphere of argon (this casting and pulverization process also applied to that used in Comparative Example 2 to be described later). A paste was then prepared by dispersing 100 parts by weight of the obtained hydrogen-absorbing alloy powder MC in 10 parts by weight of a 5% aqueous solution of polyethylene oxide (PEO) as a binder. The paste was applied on both sides of a collector and dried. The collector with the alloy was cut to a prescribed length, which was then rolled, to give a negative electrode $E_{MC}$. Example 1-① was repeated except that this negative electrode $E_{MC}$ was used, to prepare a comparison battery $B_{MC}$.

Test for degree of activation

Figure 3:
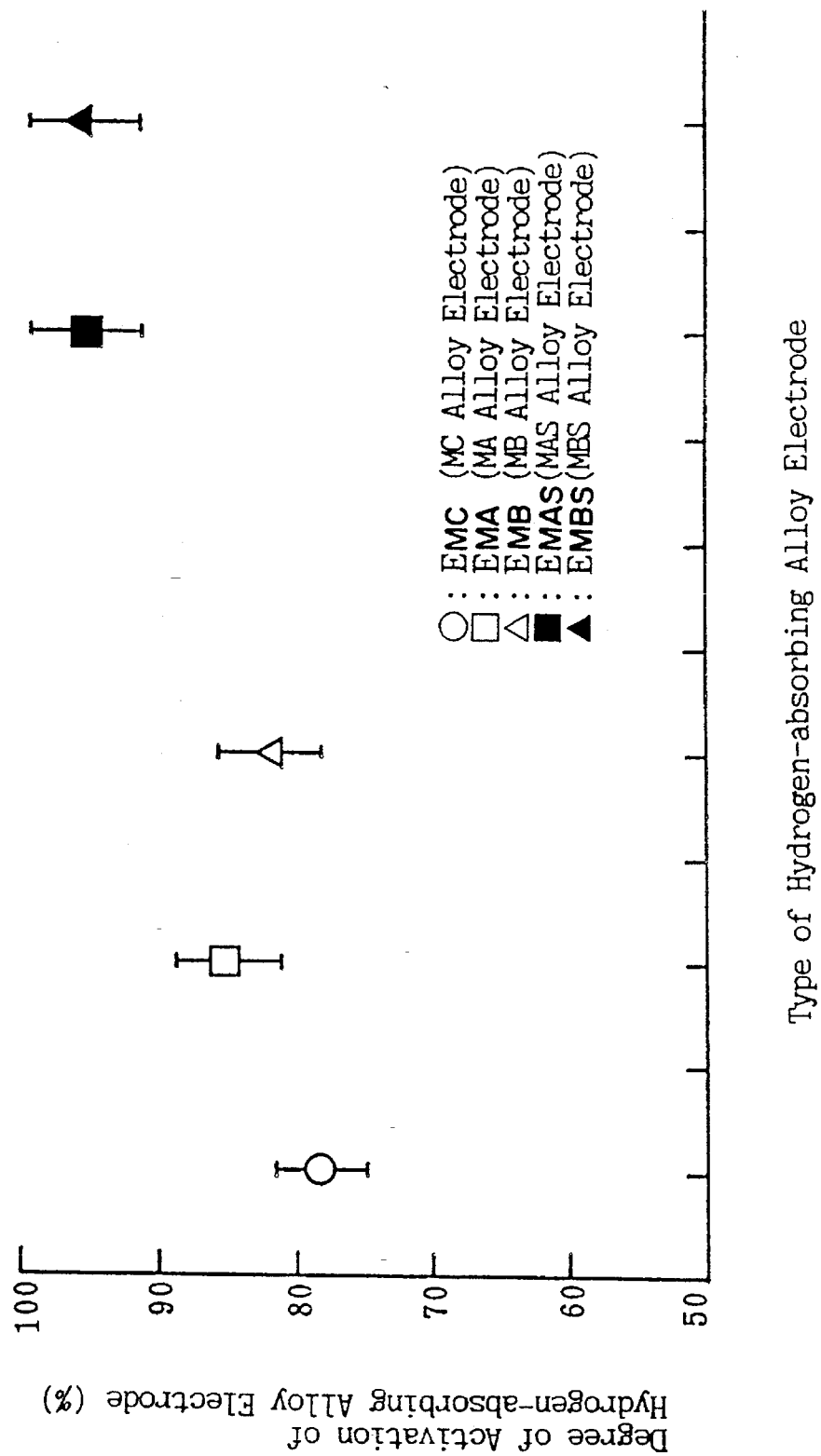
FIG. 3 is a graph showing the degree of activation (%) of each of the hydrogen-absorbing alloy electrodes obtained in Examples.

Test cells were fabricated in the following manner with the hydrogen-absorbing alloy powders, MA, MB, MAS and MBS used for the negative electrodes of the batteries according to the present invention and the hydrogen-absorbing alloy powder MC used for the negative electrode of the comparison battery. These test cells were charged at a current of 50 mA/g for 8 hours and then discharged at 200 mA/g or 50 mA/g until a discharge termination voltage of 1.0 was reached, and the discharge capacity at each current was measured. The degree of activation of each of the hydrogen-absorbing alloy electrodes was obtained by the calculation formula given below. The results are shown in FIG. 3.

Fabrication of test cells

① Preparation of negative electrodes from the hydrogen-absorbing alloy powders MA, MB, MAS and MBS Pastes were prepared by dispersing 10 g of each of the hydrogen-absorbing alloy powders in 1 g of 5% by weight aqueous PEO (polyethylene oxide) solution and the dispersions were then heat-rolled into plates, which were cut to a prescribed length. The cut plates were sintered in an electric oven at 900° C. under an argon atmosphere, to give hydrogen-absorbing alloy electrodes $E_{MA}$, $E_{MB}$, $E_{MAS}$ and $E_{MBS}$, respectively.

② Preparation of a negative electrode from the hydrogen-absorbing alloy powder MC A paste was prepared by mixing 10 g of the hydrogen-absorbing alloy powder, an aqueous solution containing 0.84 g of PTFE (polytetrafluoroethylene) and 1 g of 5% by weight aqueous PEO solution and the paste was heat-rolled into a plate, which was then cut to a prescribed length. The cut plate was wrapped in a neckel mesh and pressed, to give a hydrogen-absorbing alloy electrode $E_{MC}$.

Test cells were fabricated with each of the above hydrogen-absorbing alloy electrodes as a test electrode (negative electrode), a counter electrode of a cylindrical sintered nickel electrode having a sufficiently large electrochemical capacity compared to the test electrodes, and a reference electrode of a plate-shaped sintered nickel electrode, and an electrolyte of 30% by weight aqueous potassium hydroxide solution.

Figure 2:
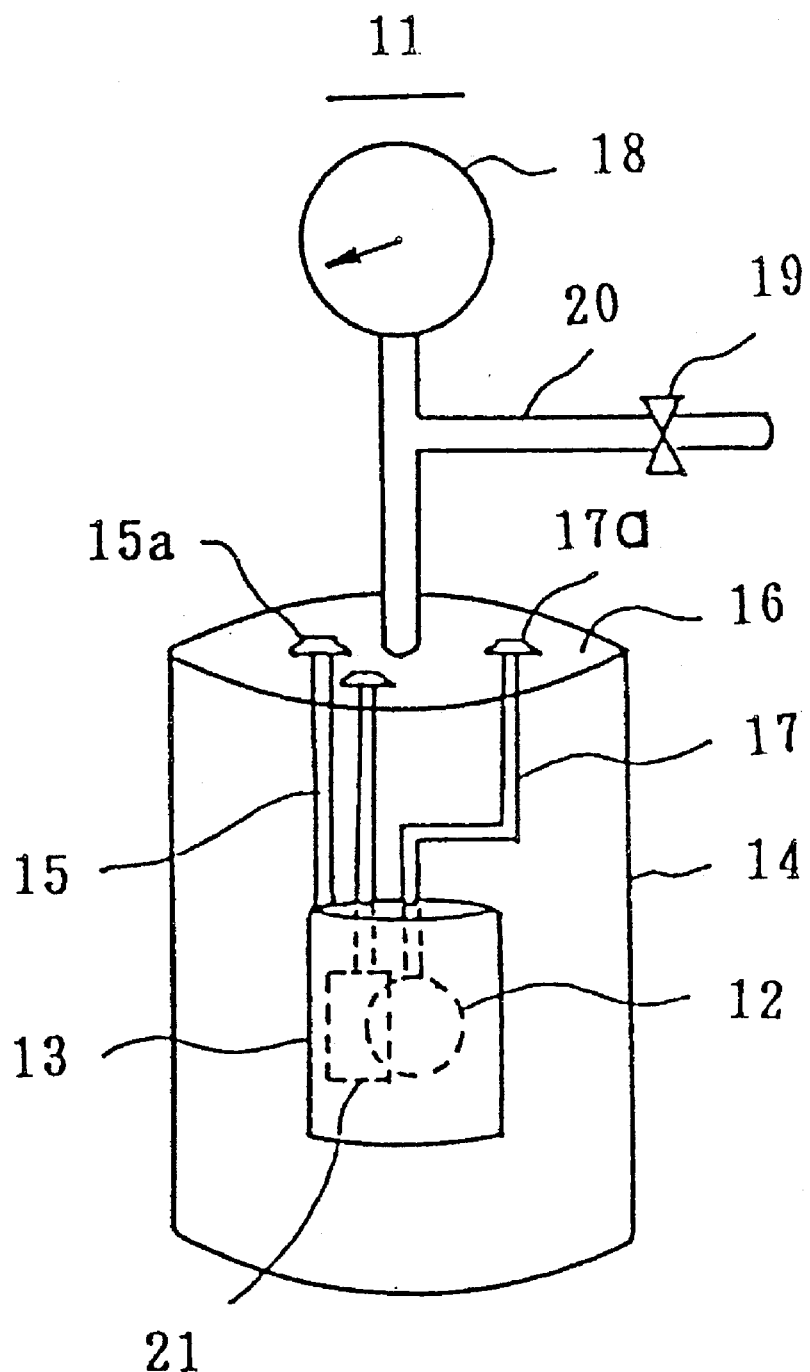
FIG. 2 is a schematic perspective view of one of the test cells fabricated in Examples.

FIG. 2 is a schematic perspective view of the test cell thus fabricated. In the FIGURE, the test cell 11 comprises a disc-shaped hydrogen-absorbing alloy electrode (test electrode) 12, a cylindrical sintered nickel electrode (counter electrode) 13, a plate-shaped sintered nickel electrode (reference electrode) 21, an insulated closed container (of polypropylene) 14 and other parts.

The sintered nickel electrode 13 is held with a positive electrode lead 15 connected to the top surface 16 of the closed container 14. The hydrogen-absorbing alloy electrode 12 is held vertically at near the center of the cylinder of the sintered nickel electrode 13, with a negative electrode lead 17 connected to the top surface 16 of the closed container 14.

The ends of the positive electrode lead 15 and negative electrode lead 17 are, penetrating the top surface 16 of the closed container 14, exposed upwardly, and connected there to a positive electrode terminal 15a and a negative electrode terminal 17a, respectively.

The hydrogen-absorbing alloy electrode 12 and the sintered nickel electrode 13 are immersed in the alkaline electrolyte (30% by weight aqueous potassium hydroxide solution, not shown), the space above which is filled with nitrogen so that a prescribed pressure is applied to the hydrogen-absorbing alloy electrode 12.

On the central part of the top surface 16 of the closed container 14, a pressure gauge 18 and a relief pipe 20 equipped with a relief valve 19 are mounted, in order to prevent the inside pressure of the closed container 14 from elevating above a prescribed level.

Calculation formula of the degree of activation

Degree of activation (%)=C200/(C200+C50)×100 where C200=discharge capacity at 200 mA/g C50=discharge capacity at 50 mA/g FIG. 3 is a graph showing the degrees of activation of the hydrogen-absorbing alloy electrodes, with the ordinate representing the degree of activation (%) of hydrogen-absorbing alloy electrode and the abscissa the type of hydrogen-absorbing alloy electrode. As shown in the FIGURE, while the hydrogen-absorbing alloy electrodes $E_{MA}$ and $E_{MB}$ have a high average degree of activation of at least 80%, the hydrogen-absorbing alloy electrode $E_{MC}$ has a low one of less than 78%. It is apparent from this fact that electrodes having been consolidated by sintering particles of an hydrogen-absorbing alloy powder prepared by centrifugal spraying or gas atomizing and having a spherical or nearly spherical shape have higher degree of activation, i.e. better high-rate discharge characteristics, than an electrode having consolidated by paste method particles of the same hydrogen-absorbing alloy hydrogen-absorbing alloy hydrogen-absorbing alloy prepared by pulverization and having irregular shapes.

FIG. 3 further shows that the electrode $E_{MAS}$, using the hydrogen-absorbing alloy powder MAS having been dry surface treated have higher degree of activation than the electrode $E_{MA}$ prepared in the same manner as for $E_{MAS}$ except for using the hydrogen-absorbing alloy powder MA having been not dry surface treated. Comparison of the electrode $E_{MBS}$ with the electrode $E_{MB}$, having the same relationship as above, shows that $E_{MBS}$ has higher degree of activation, i.e. better high-rate characteristics, than $E_{MB}$. Accordingly, electrodes using a dry surface treated hydrogen-absorbing alloy powder are excellent particularly in high-rate discharge characteristics.

[Charge-discharge cycle test]

Figure 4:
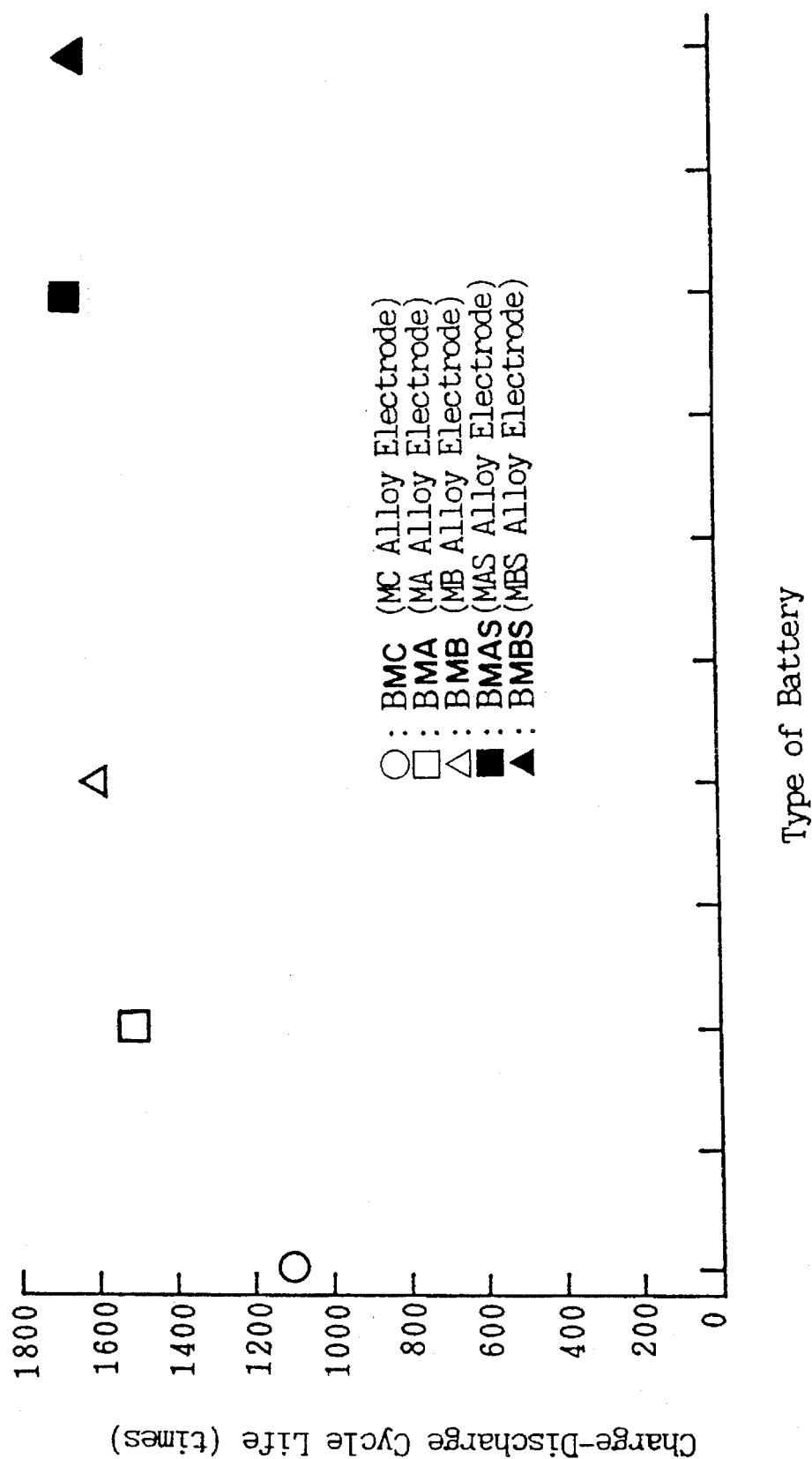
FIG. 4 is a graph showing the charge-discharge cycle life (times) of each of the batteries fabricated in Examples.

The batteries according to the present invention, $B_{MA}$, $B_{MB}$, $B_{MAS}$ and $B_{MBS}$ and the comparison battery $B_{MC}$ were subjected to repeated cycles of charging at a current of 1.5 C up to a voltage of 10 mV below the maximum voltage and discharging at a current of 1.5 C to a discharge termination voltage of 1.0 V, to test for the cycle characteristics. The results are shown in FIG. 4. The time point when the discharge capacity decreases to 50% of the initial capacity was taken as the life of the battery.

FIG. 4 shows the cycle characteristics of the batteries, with the ordinate representing the cycle life (times) and the abscissa the type of battery. As shown in the FIGURE, while the batteries of the present invention $B_{MA}$ and $B_{MB}$ have a high cycle life of at least 1,500 times, the comparison battery $B_{MC}$ has a short cycle life of about 1,100 times. Accordingly, electrodes having consolidated by sintering particles of an hydrogen-absorbing alloy powder prepared by centrifugal spraying or gas atomizing and having a spherical or nearly spherical shape have better cycle characteristics than an electrode having consolidated by paste method particles of the same hydrogen-absorbing alloy prepared by casting and pulverization and having irregular shapes.

FIG. 4 further shows that the battery $B_{MAS}$, using the hydrogen-absorbing alloy powder having been dry surface treated has longer cycle life than the battery $B_{MA}$ prepared in the same manner as for $B_{MAS}$ except for using the hydrogen-absorbing alloy powder having been not dry surface treated. Comparison of the battery $B_{MBS}$ with the battery $B_{MB}$, having the same relationship as above, shows that $B_{MBS}$ has longer cycle life. Accordingly, batteries using a dry surface treated hydrogen-absorbing alloy powder are excellent particularly in cycle characteristics.

[Test for inside pressure of battery]

The batteries according to the present invention, $B_{MA}$, $B_{MB}$, $B_{MAS}$ and $B_{MBS}$, and the comparison battery $B_{MC}$ were charged at a current of 1 C for 2 hours and then tested with a pressure gauge for the inside pressure. The results are shown in FIG. 5.

Figure 5:
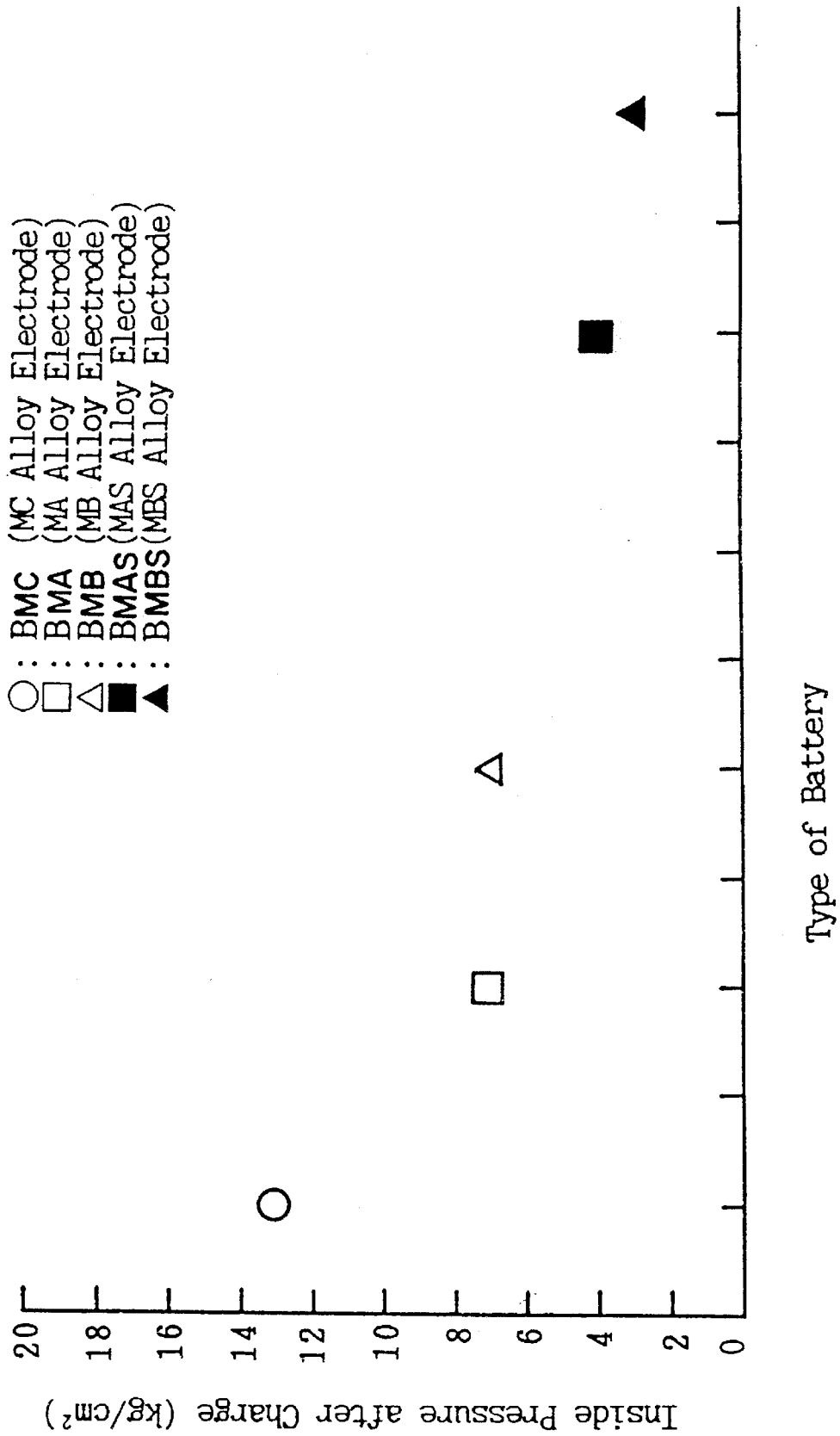
FIG. 5 is a graph showing the inside pressure (kg/cm$^2$) after charge of each of the batteries fabricated in Examples.

FIG. 5 shows the inside pressures of the batteries, with the ordinate representing the inside pressure (kg/cm$^2$) after charge and the abscissa the type of battery. As shown in the FIGURE, while the batteries of the present invention $B_{MA}$ and $B_{MB}$ have a low inside pressure after charge of 7 kg/cm$^2$, the comparison battery $B_{MC}$ has a high inside pressure after charge of 13 kg/cm$^2$. Accordingly, electrodes having consolidated by sintering particles of an hydrogen-absorbing alloy powder prepared by centrifugal spraying or gas atomizing and having a spherical or nearly spherical shape have lower inside pressure than an electrode having consolidated by paste method particles of the same hydrogen-absorbing alloy prepared by casting and pulverization and having irregular shapes. Thus the batteries of the present invention are excellent in cycle characteristics and, being chargeable at a relatively large current, excellent in rapid-charge characteristics.

FIG. 5 further shows that the battery $B_{MAB}$, using the hydrogen-absorbing alloy powder having been dry surface treated have lower inside pressure than the battery $B_{MA}$ prepared in the same manner as for $B_{MAS}$ except for using the hydrogen-absorbing alloy powder having been not dry surface treated. Comparison of the battery $B_{MBS}$ with the battery $B_{MB}$, having the same relationship as above, shows that $B_{MBS}$ has lower inside pressure. Accordingly, batteries using a dry surface treated hydrogen-absorbing alloy powder have low inside pressure and are excellent particularly in cycle characteristics and rapid-charge characteristics.

[Test of negative electrode for flexibility]

The batteries according to the present invention $B_{MA}$ and $B_{MAF}$ were tested for inside pressure, in order to check the occurrence of internal short circuit. The results are shown in Table 3. The number of each of the samples tested was 100.

TABLE 3

| Battery | Percentage defective |
|---|---|
| $B_{MA}$ | 5 |
| $B_{MAF}$ | 0 |

As shown in Table 3, while no defective was found with the samples of the battery of the present invention $B_{MAF}$, the battery of the present invention $B_{MA}$ generated 5% of the total of defectives due to internal short circuit. Defective samples were disassembled and examined. It was concluded that the internal short circuit had occurred due to dropping off of the negative electrode hydrogen-absorbing alloy. Accordingly, addition of nickel powder to a hydrogen-absorbing alloy electrode material can make the negative electrode more flexible and prevent occurrence of internal short circuit due to dropping off of the hydrogen-absorbing alloy powder upon preparation of the electrode by wrapping.

Example 2

[Example 2-①]

A mixture of Ti, Zr, Mn and Ni in a mole ratio of 0.25:0.75:0.6:0.4:1.2 was prepared and the mixture was melted in a high frequency induction heating furnace at 1,500° C., to give a hydrogen-absorbing alloy melt. The hydrogen-absorbing alloy melt was formed by gas atomization into a hydrogen-absorbing alloy powder TA (composition formula: $Ti_{0.25}Zr_{0.75}V_{0.6}Mn_{0.4}Ni_{1.2}$) with particles having a spherical or nearly spherical shape and a diameter ranging from 10 to 100 μm (average particle diameter: 60 μm). Example 1-① was repeated except that the hydrogen-absorbing alloy powder TA was used instead of the hydrogen-absorbing alloy powder MA, to prepare a negative electrode $E_{TA}$. Example 1-① was further repeated except that the negative electrode $E_{TA}$ was used, to obtain a battery according to the present invention $B_{TA}$.

[Example 2-②]

Example 2-① was repeated except that a hydrogen-absorbing alloy powder TB prepared by centrifugal spraying was used, to prepare a negative electrode $E_{TB}$. Example 2-① was further repeated except that this negative electrode $E_{TB}$ was used, to prepare a battery according to the present invention, $B_{TB}$.

[Example 2-③]

Example 2-① was repeated except that a hydrogen-absorbing alloy powder TAS obtained by dry surface treating the hydrogen-absorbing alloy powder TA was used, to prepare a negative electrode $E_{TAS}$. Example 2-① was further repeated except that this negative electrode $E_{TAS}$ was used, to prepare a battery according to the present invention, $B_{TAS}$.

The hydrogen-absorbing alloy power TAS had an average particle diameter of 60 μm.

[Example 2-④]

Example 2-① was repeated except that a hydrogen-absorbing alloy powder TBS obtained by dry surface treating the hydrogen-absorbing alloy powder TB obtained by centrifugal spraying was used, to prepare a negative electrode $E_{TBS}$. Example 1-① was further repeated except that this negative electrode $E_{TBS}$ was used, to prepare a battery according to the present invention, $B_{TBS}$.

The hydrogen-absorbing alloy power TBS had an average particle diameter of 60 μm.

Comparative Example 2

A hydrogen-absorbing alloy powder TC was prepared by casting and pulverization. A paste was then prepared by dispersing 100 parts by weight of the obtained hydrogen-absorbing alloy powder TC in 10 parts by weight of a 5% aqueous solution of polyethylene oxide (PEO) as a binder. The paste was applied on both sides of a collector and dried. The collector with the alloy was cut to a prescribed length, which were then rolled, to give a negative electrode $E_{TC}$. Example 2-① was repeated except that this negative electrode $E_{TC}$ was used instead of the negative electrode $E_{TA}$, to prepare a comparison battery $B_{TC}$.

Test for degree of activation

Test cells of the same type as those shown in the item Fabrication of test cells in Example 1 were fabricated in the same manner with the hydrogen-absorbing alloy powders, TA, TB, TAS and TBS used for the negative electrodes of the batteries according to the present invention and the hydrogen-absorbing alloy powder TC used for the negative electrode of the comparison battery. These test cells were tested for the degree of activation in the same manner as shown in the item Fabrication of test cells in Example 1.

Figure 6:
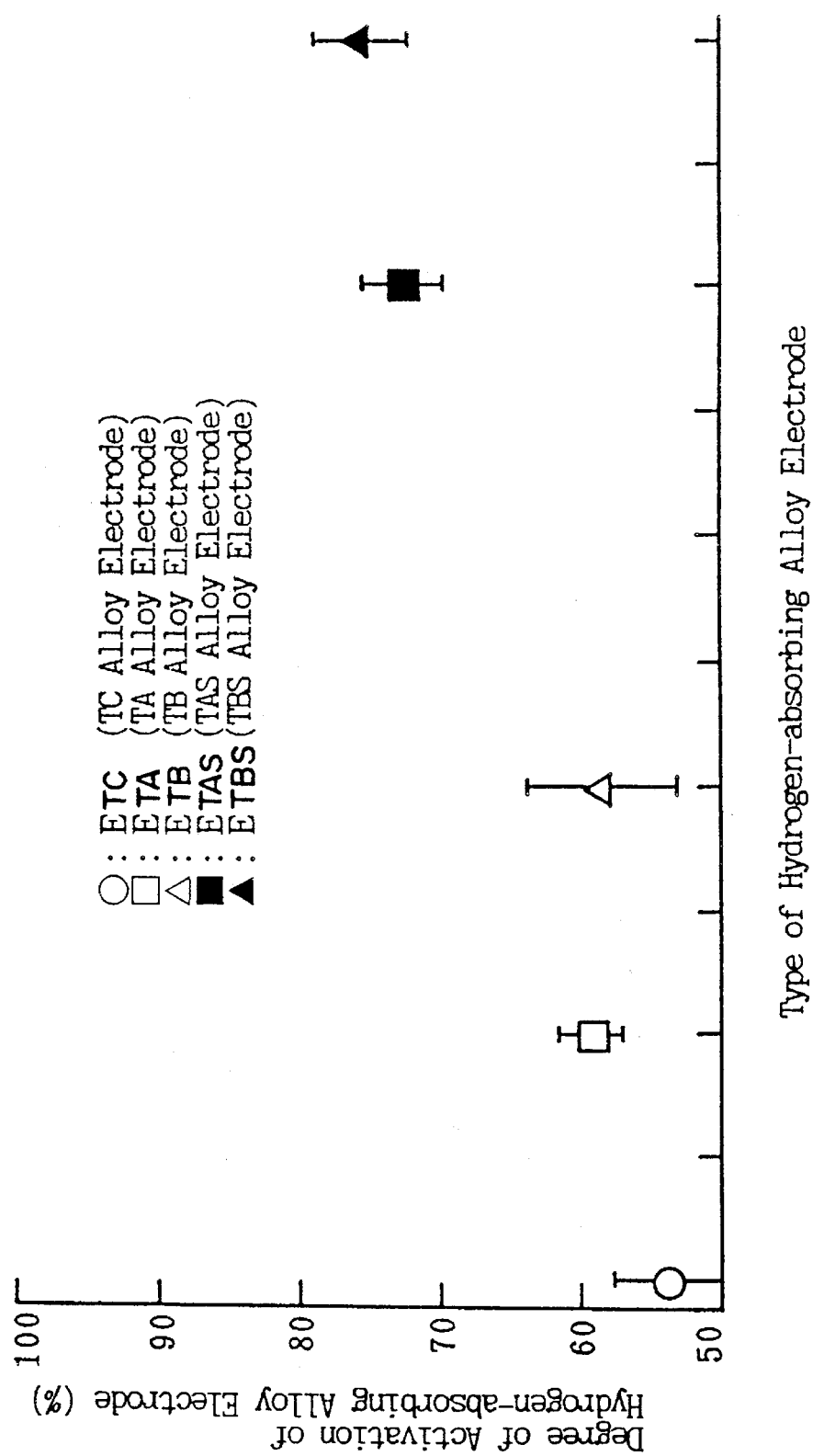
FIG. 6 is a graph showing the degree of activation (%) of each of the hydrogen-absorbing alloy electrodes obtained in Examples.

The results are shown in FIG. 6.

FIG. 6 is a graph showing the degrees of activation of the hydrogen-absorbing alloy electrodes, with the ordinate representing the degree of activation (%) of hydrogen-absorbing alloy electrode and the abscissa the type of hydrogen-absorbing alloy electrode. As shown in the FIGURE, while the hydrogen-absorbing alloy electrodes $E_{TA}$ and $E_{TB}$ have a high average degree of activation of about 58%, the hydrogen-absorbing alloy electrode $E_{TC}$ has a low one of about 54%. It is apparent from this fact that electrodes having consolidated by sintering particles of an hydrogen-absorbing alloy powder prepared by centrifugal spraying or gas atomizing and having a spherical or nearly spherical shape have higher degree of activation, i.e. better high-rate discharge characteristics, than an electrode having consolidated by paste method particles of the same hydrogen-absorbing alloy prepared by pulverization and having irregular shapes.

FIG. 6 further shows that the electrode $E_{TAS}$, using the hydrogen-absorbing alloy powder having been dry surface treated have higher degree of activation than the electrode $E_{TA}$ prepared in the same manner as for $E_{TAS}$ except for using the hydrogen-absorbing alloy powder having been not dry surface treated. Comparison of the electrode $E_{TBS}$ with the electrode $E_{TB}$, having the same relationship as above, shows that $E_{TBS}$ has higher degree of activation than $E_{TB}$. Accordingly, electrodes using a dry surface treated hydrogen-absorbing alloy powder have a high degree of activation and are excellent particularly in high-rate discharge characteristics.

[Charge-discharge cycle test]

Figure 7:
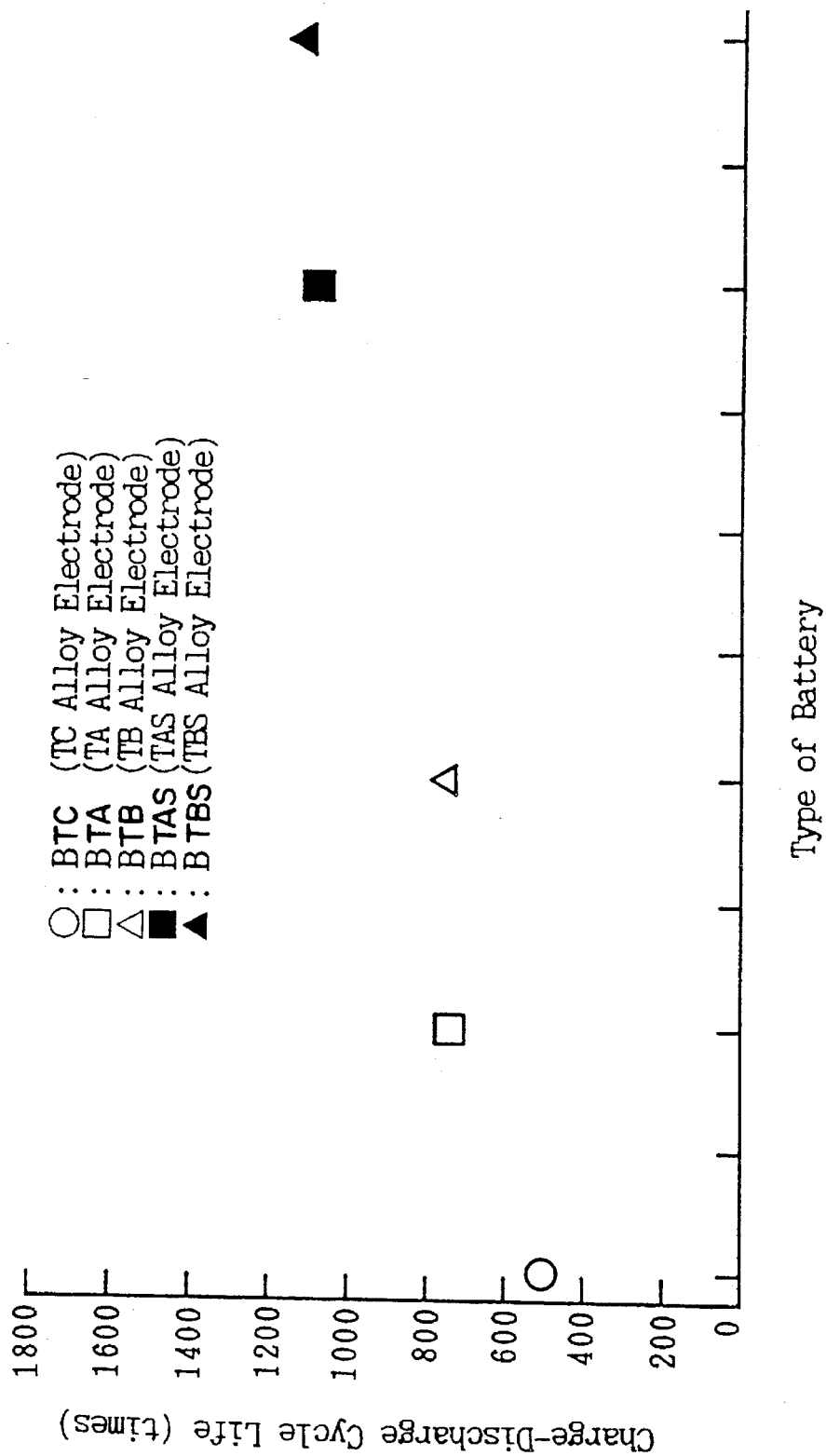
FIG. 7 is a graph showing the charge-discharge cycle life (times) of each of the batteries fabricated in Examples.

The batteries according to the present invention, $B_{TA}$, $B_{TB}$ and $B_{TAS}$ and $B_{TBS}$ and the comparison battery $B_{TC}$ were subjected to repeated cycles of charging and discharging under the same conditions as described in the item [Charge-discharge cycle test] in Example 1, to test for the cycle characteristics. The results are shown in FIG. 7. The time point when the discharge capacity decreases to 50% of the initial capacity was taken as the life of the battery.

FIG. 7 shows the cycle characteristics of the batteries, with the ordinate representing the cycle life (times) and the abscissa the type of battery. As shown in the FIGURE, while the batteries of the present invention $B_{TA}$ and $B_{TB}$ have a high cycle life of at least 700 times, the comparison battery $B_{TC}$ has a short cycle life of about 500 times. Accordingly, electrodes having consolidated by sintering particles of an hydrogen-absorbing alloy powder prepared by centrifugal spraying or gas atomizing and having a spherical or nearly spherical shape have better cycle characteristics than an electrode having consolidated by paste method particles of the same hydrogen-absorbing alloy prepared by casting and pulverization and having irregular shapes.

FIG. 7 further shows that the battery $B_{TAS}$, using the hydrogen-absorbing alloy powder having been dry surface treated has longer cycle life than the battery $B_{TA}$ prepared in the same manner as for $B_{TAS}$ except for using the hydrogen-absorbing alloy powder having been not dry surface treated. Comparison of the battery $B_{TBS}$ with the battery $B_{TB}$, having the same relationship as above, shows that $B_{TBS}$ has longer cycle life. Accordingly, batteries using a dry surface treated hydrogen-absorbing alloy powder are excellent particularly in cycle characteristics.

[Test for inside pressure of battery]

The batteries according to the present invention, $B_{TA}$, $B_{TB}$, $B_{TAS}$ and $B_{TBS}$, and the comparison battery $B_{TC}$ were tested in the same manner as described in the item [Test for inside pressure of battery] in Example 1. The results are shown in FIG. 8.

Figure 8:
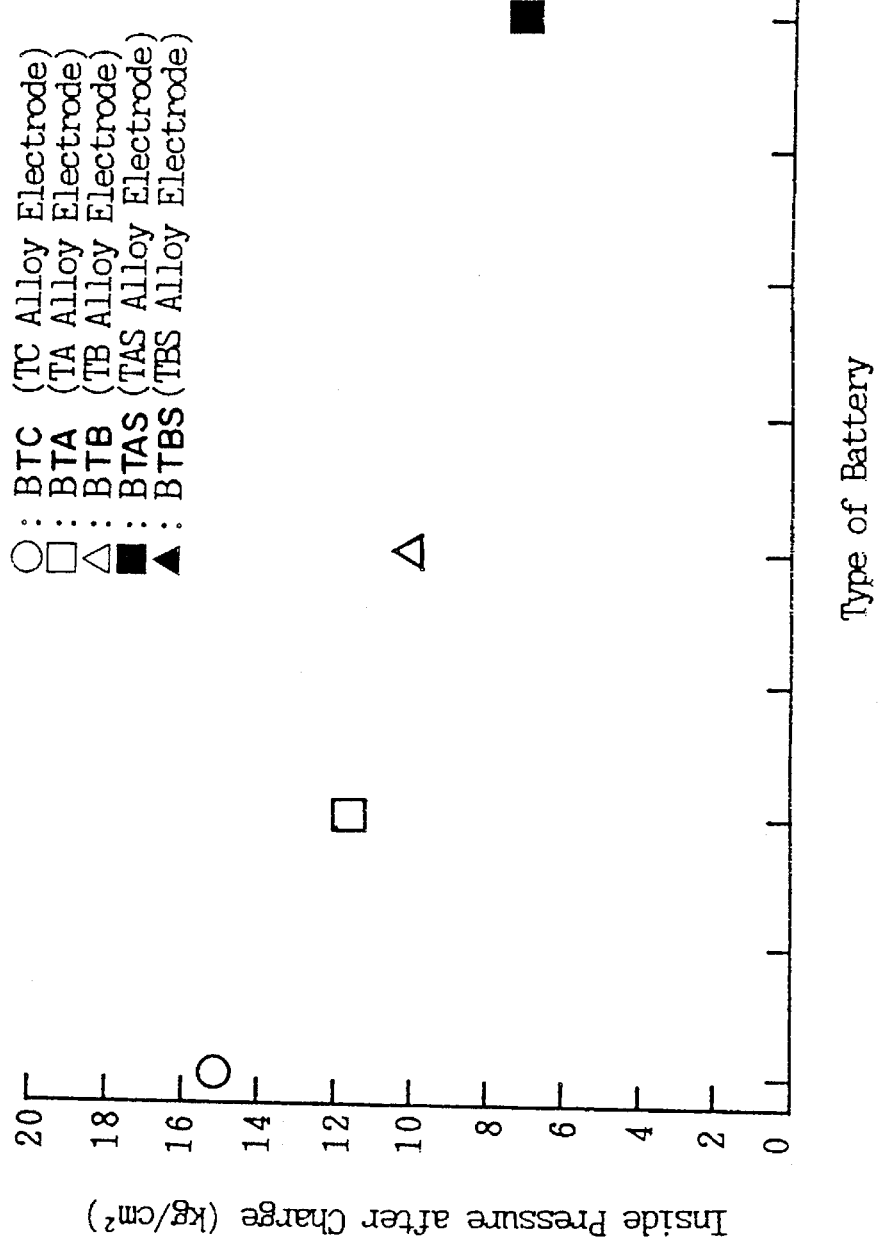
FIG. 8 is a graph showing the inside pressure (kg/cm$^2$) after charge of each of the batteries fabricated in Examples.

FIG. 8 shows the inside pressures of the batteries, with the ordinate representing the inside pressure (kg/cm$^2$) after charge and the abscissa the type of battery. As shown in the FIGURE, while the batteries of the present invention $B_{TA}$ and $B_{TB}$ have a low inside pressure after charge of not more than 12 kg/cm$^2$, the comparison battery $B_{TC}$ has a high inside pressure after charge of 15 kg/cm$^2$. Accordingly, electrodes having consolidated by sintering particles of an hydrogen-absorbing alloy powder prepared by centrifugal spraying or gas atomizing and having a spherical or nearly spherical shape have lower inside pressure than an electrode having consolidated by paste method particles of the same hydrogen-absorbing alloy prepared by casting and pulverization and having irregular shapes. Thus the batteries of the present invention are excellent in cycle characteristics and rapid-charge characteristics.

FIG. 8 further shows that the battery $B_{TAS}$, using the hydrogen-absorbing alloy powder having been dry surface treated have lower inside pressure than the battery $B_{TA}$ prepared in the same manner as for $B_{TAS}$ except for using the hydrogen-absorbing alloy powder having been not dry surface treated. Comparison of the battery $B_{TBS}$ with the battery $B_{TB}$, having the same relationship as above, shows that $B_{TBS}$ has lower inside pressure. Accordingly, batteries using a dry surface treated hydrogen-absorbing alloy powder have low inside pressure and are excellent particularly in cycle characteristics and rapid-charge characteristics.

Example 3

Preparation of hydrogen-absorbing alloy electrodes

Hydrogen-absorbing alloy powders as shown below and having the same composition ($MmNi_{3.5}Co_{0.7}Mn_{0.6}Al_{0.2}$; Mm: Misch metal) were used alone or mixed in ratios as shown in Tables 4 and 5, to prepare alloy powder mixtures. Slurries were prepared by adding 160 g of a 5% aqueous polyethylene oxide (PEO) solution to 800 g of each of the alloy powder mixtures. The slurries were each applied on both sides of a 0.08-mm thick perforated metal plate, and the plates with the slurries were dried to give 19 types of hydrogen-absorbing alloy electrodes (size: 0.5 mm×20 mm×30 mm), A1 through A19. Powder 1: A spherical powder having an average particle diameter of 50 μm (100 mesh pass), obtained by gas atomizing. Powder 2: A pulverized powder having an average particle diameter of 50 μm (100 mesh pass), obtained by mechanically pulverizing ingots. Powder 3: A pulverized powder having an average particle diameter of 50 μm (100 mesh pass), obtained by mechanically pulverizing a gas-atomized powder of coarser than 100 mesh. Powder 4: A pulverized powder having an average particle diameter of 50 μm (100 mesh pass), obtained by mechanically pulverizing alloy flakes prepared by stripping casting.

Tables 4 and 5 also shows the packing density of the hydrogen-absorbing electrodes thus prepared.

TABLE 4

| Battery No. | Mixing ratio of hydrogen absorbing alloy powder | | | | Packing density (g/cc) | C1 (mAh) | C2 (mAh) | C1/C2 |
|---|---|---|---|---|---|---|---|---|
| | Powder 1 (%) | Powder 2 (%) | Powder 3 (%) | Powder 4 (%) | | | | |
| A1 | 100 | — | — | — | 5.4 | 219 | 354 | 0.62 |
| A2 | 95 | 5 | — | — | 5.5 | 295 | 360 | 0.82 |
| A3 | 95 | — | 5 | — | 5.4 | 290 | 353 | 0.82 |
| A4 | 95 | — | — | 5 | 5.5 | 301 | 362 | 0.83 |
| A5 | 70 | 30 | — | — | 5.4 | 298 | 355 | 0.84 |
| A6 | 70 | — | 30 | — | 5.3 | 290 | 349 | 0.83 |
| A7 | 70 | — | — | 30 | 5.4 | 290 | 354 | 0.82 |
| A8 | 50 | 50 | — | — | 5.2 | 274 | 342 | 0.80 |
| A9 | 50 | — | 50 | — | 5.3 | 282 | 348 | 0.81 |
| A10 | 50 | — | — | 50 | 5.3 | 283 | 349 | 0.81 |

TABLE 5

| Battery No. | Mixing ratio of hydrogen absorbing alloy powder | | | | Packing density (g/cc) | C1 (mAh) | C2 (mAh) | C1/C2 |
|---|---|---|---|---|---|---|---|---|
| | Powder 1 (%) | Powder 2 (%) | Powder 3 (%) | Powder 4 (%) | | | | |
| A11 | 20 | 80 | — | — | 5.1 | 280 | 335 | 0.84 |
| A12 | 20 | — | 80 | — | 5.2 | 283 | 341 | 0.83 |

TABLE 5-continued

| Battery No. | Mixing ratio of hydrogen absorbing alloy powder | | | | Packing density (g/cc) | C1 (mAh) | C2 (mAh) | C1/C2 |
|---|---|---|---|---|---|---|---|---|
| | Powder 1 (%) | Powder 2 (%) | Powder 3 (%) | Powder 4 (%) | | | | |
| A13 | 20 | — | — | 80 | 5.2 | 283 | 341 | 0.83 |
| A14 | 10 | 90 | — | — | 4.8 | 258 | 315 | 0.82 |
| A15 | 10 | — | 90 | — | 4.9 | 263 | 321 | 0.82 |
| A16 | 10 | — | — | 90 | 4.8 | 258 | 316 | 0.82 |
| A17 | — | 100 | — | — | 4.8 | 245 | 314 | 0.78 |
| A18 | — | — | 100 | — | 4.9 | 258 | 327 | 0.79 |
| A19 | — | — | — | 100 | 4.7 | 251 | 310 | 0.81 |

[Assembly of nickel hydride secondary battery]

Nineteen (19) open-type nickel hydride secondary batteries A1 through A19 were assembled by providing a pair of sintered nickel electrodes in such positions as to face both sides of each of the above hydrogen-absorbing alloy electrodes. An alkaline solution obtained by dissolving 1M of lithium hydroxide in a 6M aqueous potassium hydroxide solution was used as electrolyte.

[Evaluation of the characteristics of the hydrogen-absorbing alloy batteries]

The batteries were subjected to a treatment for activating the negative electrodes (hydrogen-absorbing alloy electrodes), which comprised repeating 5 cycles consisting of 10-hour charge at 50 mA and discharge at 50 mA to a discharge termination voltage of 1.0 V.

After the above activation, each of the batteries was charged at 50 mA for 10 hours and then discharged at 200 mA to a discharge termination voltage of 1.0 V, to obtain the discharge capacity C1 (discharge capacity upon high-rate discharge).

Each battery was then discharged, with the discharge current decreased from 200 mA to 50 mA, to a discharge termination voltage of 1.0 V, to obtain the discharge capacity C. The value of C was added to the above discharge capacity C1 and the sum was expressed as the discharge capacity C2, which nearly corresponds to the discharge capacity (upon low-rate discharge) when the battery is charged at 50 mA for 10 hours and then discharged at 50 mA to a termination voltage of 1.0 V. The ratio between the discharge capacities C1 and C2, C1/C2, is an index showing the level of the electronic conductivity of the hydrogen-absorbing alloy electrode, and increases with increasing electronic conductivity. The discharge capacities C1 and C2, and C1/C2 are shown in Tables 4 and 5 above.

As seen from the Tables, the batteries A2 through A13, with the negative electrodes utilizing mixed hydrogen-absorbing alloy powders of the spherical powder 1 with the pulverized powder 2, 3 or 4 in a ratio by weight within the range of 20:80 to 95:5 have a high negative electrode packing density of 5.1 to 5.5 g/cc and have a large C1/C2 of 0.80 to 0.84. On the other hand, the battery A1, with the negative electrode using a single hydrogen-absorbing alloy powder, has a low C1/C2 of 0.62, although it has a large negative electrode density of 5.4 g/cc. Next, the batteries A14 through A19, with the negative electrodes using mixed hydrogen-absorbing powders containing at least 90% by weight of pulverized powders, have a small negative electrode packing density of 4.7 to 5.0 g/cc, although they have a somewhat large C1/C2 of 0.78 to 0.82. From these results, it is understood that, in order to obtain a batterty exhibiting excellent discharge characteristics upon both high-rate and low-rate discharge, it is necessary to use a hydrogen-absorbing alloy electrode having a high packing density and electronic conductivity, which uses a mixed powder of a spherical powder and a pulverized powder in a ratio by weight of 20:80 to 95:5.

Obviously, numerous modifications and variations of the present invention are possible in light of the above teachings. It is therefore to be understood that within the scope of the appended claims, the invention may be practiced otherwise than as specifically described herein.

What is claimed is:

1. A process for producing hydrogen-absorbing alloy electrodes, which comprises the successive steps of:
   an alloy powder preparation step which comprises preparing a hydrogen-absorbing alloy powder by centrifugal spraying or gas atomizing, particles of said hydrogen-absorbing alloy powder having a spherical shape, an ellipsoidal shape or a mixed shape including the foregoing;
   a paste preparation step which comprises preparing a paste by kneading a mixture comprising the hydrogen-absorbing alloy powder and a binder solution obtained by dissolving a binder in water or in an organic solvent; and
   a sintering step which comprises applying the paste on a collector or having a collector filled with the paste, burning the paste to decompose and remove the binder and sinter the hydrogen-absorbing alloy powder.

2. The process for producing hydrogen-absorbing alloy electrodes according to claim 1, wherein said paste preparation step comprises preparing a paste by kneading a mixture comprising 100 parts by weight of the hydrogen-absorbing alloy powder, 1 to 10% by weight based on the weight of the hydrogen-absorbing alloy powder of at least one metal powder selected from the group consisting of nickel powder, cobalt powder and nickel-cobalt alloy powder and a binder solution obtained by dissolving a binder in water or in an organic solvent.

3. The process for producing hydrogen-absorbing alloy electrodes according to claim 1, wherein said hydrogen-absorbing alloy powder has an average particle diameter of 30 to 120 μm.

4. The process for producing hydrogen-absorbing alloy electrodes according to claim 1, wherein said sintering step comprises burning the paste at a temperature of 800° to 1,000° C. for 0.5 to 2 hours.

5. The process for producing hydrogen-absorbing alloy electrodes according to claim 1, further comprising, between said alloy powder preparation step and said paste preparation step, a surface treating step which comprises dry surface treating the hydrogen-absorbing alloy powder by mixing and stirring therewith a surface treating material which is harder than the hydrogen-absorbing alloy powder.

6. The process for producing hydrogen-absorbing alloy electrodes according to claim 5, wherein said surface treating material comprises a multiplicity of fine ceramic balls, fine stainless steel balls or fine metal balls.

7. A hydrogen-absorbing alloy electrode utilizing as a material thereof a mixed powder containing a hydrogen-absorbing alloy powder with particles having a spherical shape and the same alloy in a form as mechanically pulverized in a ratio by weight of 20:80 to 95:5.

8. The hydrogen-absorbing alloy electrode according to claim 7, wherein said hydrogen-absorbing alloy powder with particles having a spherical shape has been obtained by rotating disc process, rotating nozzle process, single roll process, twin roll process or gas atomizing process.

9. The hydrogen-absorbing alloy electrode according to claim 7, wherein said powder as pulverized has been obtained by pulverizing ingots, flakes or spherical particles of said hydrogen-absorbing alloy.

* * * * *